US010109237B2

(12) United States Patent
Park et al.

(10) Patent No.: US 10,109,237 B2
(45) Date of Patent: Oct. 23, 2018

(54) PIXEL AND ORGANIC LIGHT EMITTING DISPLAY DEVICE HAVING THE SAME

(71) Applicant: Samsung Display Co., Ltd, Yongin-si, Gyeonggi-do (KR)

(72) Inventors: Kyoung-Jin Park, Guri-si (KR); Yong-Jae Kim, Seoul (KR); Young-Jin Cho, Seoul (KR); Deok-Young Choi, Suwon-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 15/405,133

(22) Filed: Jan. 12, 2017

(65) Prior Publication Data

US 2017/0249902 A1 Aug. 31, 2017

(30) Foreign Application Priority Data

Feb. 29, 2016 (KR) ........................ 10-2016-0024631

(51) Int. Cl.

| | |
|---|---|
| ***G06F 3/038*** | (2013.01) |
| ***G09G 5/00*** | (2006.01) |
| ***G09G 3/3258*** | (2016.01) |
| ***G09G 3/3233*** | (2016.01) |
| ***G09G 3/3266*** | (2016.01) |
| ***G09G 3/3275*** | (2016.01) |

(52) U.S. Cl.

CPC ......... *G09G 3/3258* (2013.01); *G09G 3/3233* (2013.01); *G09G 3/3266* (2013.01); *G09G 3/3275* (2013.01); *G09G 2300/0465* (2013.01); *G09G 2300/0809* (2013.01); *G09G 2330/021* (2013.01)

(58) Field of Classification Search

CPC .. G09G 3/3258; G09G 3/3266; G09G 3/3233; G09G 3/3275; G09G 2300/0465; G09G 2330/021; G09G 2300/0809

See application file for complete search history.

(56) References Cited

U.S. PATENT DOCUMENTS

2016/0155383 A1* 6/2016 Chen .................... G09G 3/3233 345/211

FOREIGN PATENT DOCUMENTS

KR 10-2006-0113334 A 11/2006

* cited by examiner

*Primary Examiner* — Erin M File

(74) *Attorney, Agent, or Firm* — Innovation Counsel LLP

(57) ABSTRACT

A pixel includes first through sixth transistors and an organic light emitting diode. The first transistor includes a gate electrode connected to a first node, a first electrode, and a second electrode connected to a second node. The second transistor provides a data signal to the first node in response to a scan signal. The third transistor provides a first power voltage to the first transistor in response to an emission control signal. The fourth transistor provides a reference voltage to the first node in response to a voltage control signal. The fifth transistor provides the reference voltage to the first node in response to an initialization control signal. The sixth transistor provides an initialization voltage to the second node in response to the initialization control signal. The organic light emitting diode is connected between the second node and a second power voltage.

20 Claims, 7 Drawing Sheets

PIXEL AND ORGANIC LIGHT EMITTING DISPLAY DEVICE HAVING THE SAME

CROSS REFERENCE TO RELATED APPLICATION

This application claims priority under 35 U.S.C. § 119 to Korean Patent Application No. 10-2016-0024631 filed on Feb. 29, 2016, the disclosure of which is hereby incorporated by reference herein in its entirety.

BACKGROUND

1. Technical Field

Example embodiments of the inventive concept relate to display devices. More particularly, example embodiments of the inventive concept relate to a pixel and an organic light emitting display device having the pixel.

2. Description of the Related Art

An organic light emitting display device displays an image using organic light emitting diodes (OLEDs). The organic light emitting diodes includes an organic layer between two electrodes, namely, an anode and a cathode. The holes from the anode may be combined with the electrons from the cathode in the organic layer between the anode and the cathode to emit light.

A deviation among the threshold voltages of driving transistors of pixels is caused by a manufacturing process variation, and then the display quality of the display device decreases by the luminance deviation. To solve this problem, various pixel structures inside of which the threshold voltage of the driving transistor is compensated have been developed. However, the pixels and/or the display panel driver (e.g., a scan driver, an emission control driver, etc) providing driving signals to the pixels for compensating the threshold voltage of the driving transistor may have a relatively complex structure.

SUMMARY

Example embodiments provide a pixel capable of increasing an opening ratio of the display panel.

Example embodiments provide an organic light emitting display device capable of decreasing a size of a display panel driver and reducing the power consumption.

According to some example embodiments, a pixel may include a first transistor including a gate electrode connected to a first node, a first electrode, and a second electrode connected to a second node, a second transistor including a gate electrode configured to receive a scan signal, a first electrode configured to receive a data signal, and a second electrode connected to the first node, a third transistor including a gate electrode configured to receive an emission control signal, a first electrode configured to be connected to a first power voltage, and a second electrode connected to the first electrode of the first transistor, a capacitor including a first electrode connected to the first node and a second electrode connected to the second node, a fourth transistor including a gate electrode configured to receive a voltage control signal, a first electrode configured to be connected to a reference voltage, and a second electrode connected to the first node, a fifth transistor including a gate electrode configured to receive an initialization control signal, a first electrode configured to be connected to the reference voltage, and a second electrode connected to the first node, a sixth transistor including a gate electrode configured to receive the initialization control signal, a first electrode configured to be connected to an initialization voltage, and a second electrode connected to the second node, and an organic light emitting diode including a first electrode connected to the second node and a second electrode configured to be connected to a second power voltage.

In example embodiments, the second transistor may be configured to receive the scan signal from a (K)th scan line, where K is an integer greater than 2. The fourth transistor may be configured to receive the voltage control signal from a (K−1)th scan line.

In example embodiments, the fifth and sixth transistors may be configured to receive the initialization control signal from a (K−2)th scan line.

In example embodiments, the emission control signal may correspond to an off-level when the initialization control signal corresponds to an on-level.

In example embodiments, the emission control signal may correspond to an on-level when the voltage control signal corresponds to the on-level.

In example embodiments, the emission control signal may correspond to an off-level when the scan signal corresponds to an on-level.

In example embodiments, the second transistor may be configured to receive the scan signal from a (K)th scan line, where K is an integer greater than 4. The fourth transistor may be configured to receive the voltage control signal from a (K−2)th scan line.

In example embodiments, the fifth and sixth transistors may be configured to receive the initialization control signal from a (K−4)th scan line.

According to some example embodiments, an organic light emitting display device may include a display panel including a plurality of pixels, a scan driver configured to provide a scan signal, a voltage control signal, and an initialization control signal to the pixels, an emission control driver configured to provide an emission control signal to the pixels, and a data driver configured to provide a data signal to the pixels. Each of the pixels may include a first transistor including a gate electrode connected to a first node, a first electrode, and a second electrode connected to a second node, a second transistor including a gate electrode configured to receive the scan signal, a first electrode configured to receive the data signal, and a second electrode connected to the first node, a third transistor including a gate electrode configured to receive the emission control signal, a first electrode configured to be connected to a first power voltage, and a second electrode connected to the first electrode of the first transistor, a capacitor including a first electrode connected to the first node and a second electrode connected to the second node, a fourth transistor including a gate electrode configured to receive the voltage control signal, a first electrode configured to be connected to a reference voltage, and a second electrode connected to the first node, a sixth transistor including a gate electrode configured to receive the initialization control signal, a first electrode configured to be connected to an initialization voltage, and a second electrode connected to the second node, and an organic light emitting diode including a first electrode connected to the second node and a second electrode configured to be connected to a second power voltage.

In example embodiments, each of the pixels may further include a fifth transistor including a gate electrode configured to receive the initialization control signal, a first electrode configured to be connected to the reference voltage, and a second electrode connected to the first node.

In example embodiments, each of the pixels may be configured to receive the scan signal from a (K)th scan line and receive the voltage control signal from a (K−1)th scan line, and where K is an integer greater than 2.

In example embodiments, each of the pixels may be configured to receive the initialization control signal from a (K−2)th scan line.

In example embodiments, each of the pixels may be configured to receive the scan signal from a (K)th scan line and receive the voltage control signal from a (K−2)th scan line, and where K is an integer greater than 4.

In example embodiments, each of the pixels may be configured to receive the initialization control signal from a (K−4)th scan line.

In example embodiments, the scan driver may include first through (N)th stages. The first through (N)th stages may respectively be configured to output first through (N)th scan signals, first through (N)th voltage control signals, and first through (N)th initialization control signals, and where N is an integer greater than 1.

In example embodiments, a (K)th stage may be configured to generate a (K)th voltage control signal by performing a logical OR operation with a (K−1)th scan signal and a (K−2) scan signal, and where K is an integer greater than 2.

In example embodiments, a (K)th stage may be configured to output a (K−2) scan signal as a (K)th initialization control signal, and where K is an integer greater than 2.

In example embodiments, the scan driver may be configured to provide the initialization control signal having an on-level to the pixels in an initialization period. The emission control driver may be configured to provide the emission control signal having an off-level to the pixels in the initialization period.

In example embodiments, the scan driver may be configured to provide the voltage control signal having an on-level to the pixels in a compensation period. The emission control driver may be configured to provide the emission control signal having the on-level to the pixel in the compensation period.

In example embodiments, the scan driver may be configured to provide the scan signal having an on-level to the pixels in a data writing period. The emission control driver may be configured to provide the emission control signal having an off-level to the pixels in the data writing period.

Therefore, a pixel according to example embodiments compensates a threshold voltage of a driving transistor using scan signals and an emission control signal, thereby reducing the number of signal lines and increasing an opening ratio of the display panel.

An organic light emitting display device according to example embodiments uses previous scan signals as a voltage control signal and an initialization control signal, thereby decreasing a size of the display panel driver/pixel circuit and reducing the power consumption. In addition, the organic light emitting display device can reduce the number of signal lines in the display panel, thereby increasing the opening ratio of the display panel and improving the display quality.

BRIEF DESCRIPTION OF THE DRAWINGS

Exemplary embodiments will be described more fully hereinafter with reference to the accompanying drawings, in which various embodiments are shown.

DESCRIPTION OF EMBODIMENTS

Exemplary embodiments will be described more fully hereinafter with reference to the accompanying drawings, in which various embodiments are shown.

Figure 1:
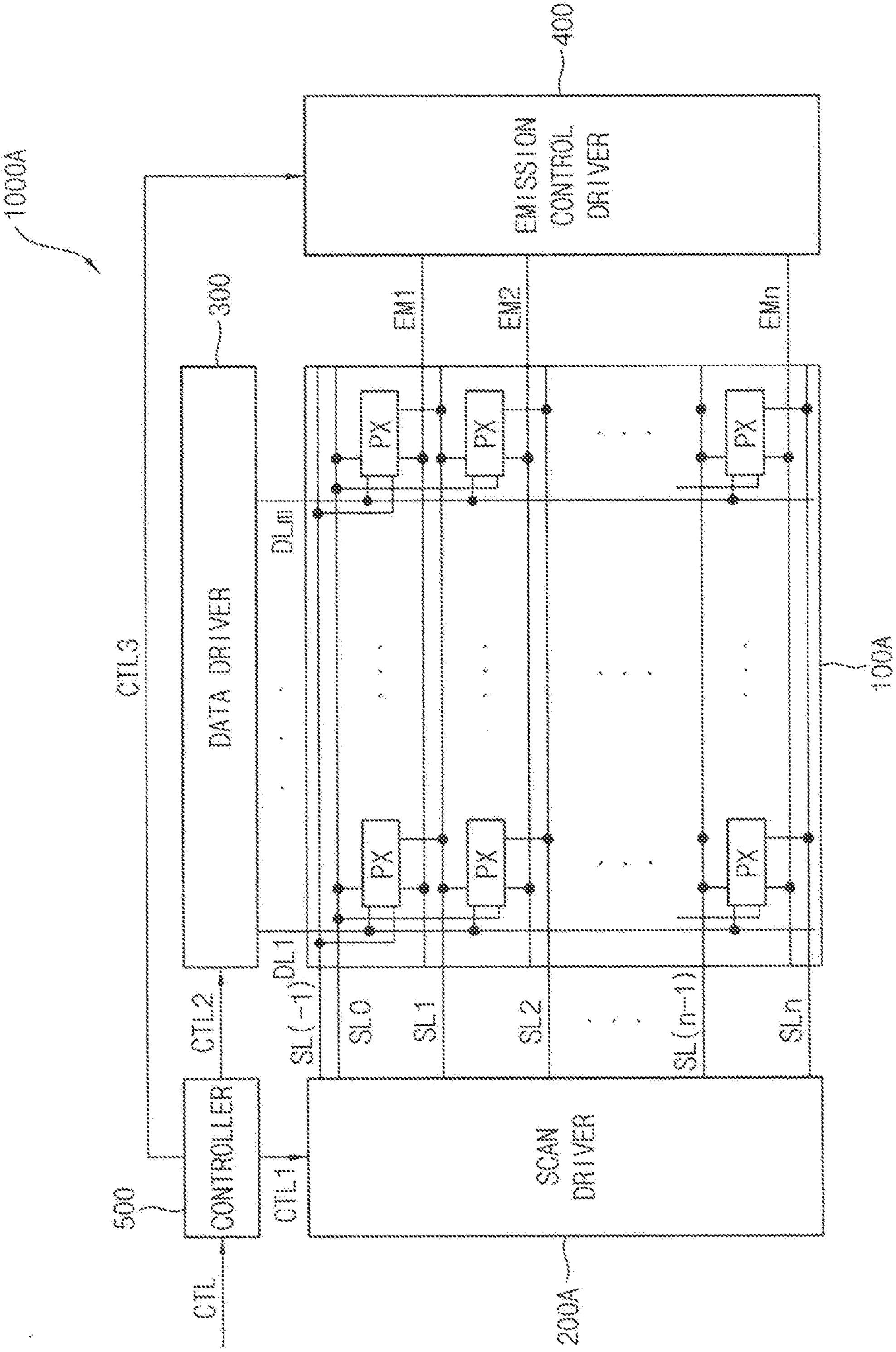
FIG. 1 is a block diagram illustrating an organic light emitting display device according to one example embodiment.

FIG. 1 is a block diagram illustrating an organic light emitting display device 1000A according to one example embodiment.

Referring to FIG. 1, the organic light emitting display device 1000A may include a display panel 100A, a scan driver 200A, a data driver 300, an emission control driver 400, and a controller 500.

The display panel 100A may include a plurality of pixels PX to display an image. For example, the display panel 100A may include n*m pixels PX because the pixels PX are arranged at locations corresponding to crossing points of scan lines SL1 through SLn and data lines DL1 through DLm.

Each pixel PX may receive a scan signal, a voltage control signal, an emission control signal, an initialization control signal, and a data signal and may emit the light based on the data signal. The pixels PX may receive the scan signal, the voltage control signal, and the initialization control signal from dummy scan lines SL(−1), SL0 or scan lines SL1 through SLn. For example, the pixel PX located in a (K)th pixel row may receive the scan signal from the (K)th scan line, may receive the voltage control signal from the (K−1)th scan line, and may receive the initialization control signal from the (K−2)th scan line, where K is an integer greater than 2.

The pixel PX may receive an initialization voltage and a reference voltage in response to the initialization control signal in an initialization period. Accordingly, voltages of a gate electrode and a second electrode of the driving transistor of the pixel PX may be initialized. The pixel PX may receive the reference voltage in response to the voltage control signal in the compensation period. Accordingly, the threshold voltage of the driving transistor may be compensated. The pixel PX may receive the data signal in a data writing period, and then may emit the light corresponding to the data signal in the emission period. In one example embodiment, the pixel PX may include six transistors, a capacitor, and an organic light emitting diode. Hereinafter, a structure of the pixel PX will be described in more detail with reference to the FIGS. 2 and 4.

The scan driver 200A may provide the scan signal, the voltage control signal, and the initialization control signal to the pixels PX via the dummy scan lines SL(−1), SL0 and the scan lines SL1 through SLn based on a first control signal CTL1.

In one example embodiment, the scan driver 200A may progressively output the scan signal to the dummy scan lines SL(−1), SL0 and the scan lines SL1 through SLn. For example, the scan driver 200A may provide a (K)th scan signal to the pixels PX located in the (K)th pixel row via the (K)th scan line. The scan driver 200A may provide a (K−1)th scan signal as the (K)th voltage control signal to the pixels PX located in the (K)th pixel row via the (K−1)th scan line. The scan driver 200A may provide a (K−2)th scan signal as the (K)th initialization control signal to the pixels PX located in the (K)th pixel row via the (K−2)th scan line. The scan driver 200A may provide the initialization control signal to the pixels PX located in the first pixel row via a first dummy scan line SL(−1) and may provide the voltage control signal to the pixels PX located in the second pixel row via a second dummy scan line SL0. The scan driver 200A may provide the initialization control signal to the pixels PX located in the second pixel row via the second dummy scan line SL0 and may provide the voltage control signal to the pixels PX located in the first pixel row via the first scan line SL1.

The data driver 300 may convert image data into the analog type data signal and may provide the data signal to the pixels PX via the data lines DL1 through DLm based on a second control signal CTL2.

The emission control driver 400 may provide the emission control signal to the pixels PX via the emission control lines EM1 through EMn based on a third control signal CTL3.

The controller 500 may control the scan driver 200A, the data driver 300, and the emission driver 400. For example, the controller 500 may receive control signals CNT outside of the display device (e.g., a system board). The controller 500 may generate the first through third control signals CTL1 through CTL3 to control the scan driver 200A, the data driver 300, and the emission control driver 400. The first control signal CTL1 for controlling the scan driver 200A may include a scan start signal, a scan clock signal, etc. The second control signal CTL2 for controlling the data driver 300 may include a horizontal start signal, a load signal, etc. The third control signal CTL3 for controlling the emission control driver 400 may include an emission control start signal, an emission control clock signal, etc. The controller 500 may generate digital type image data suitable to the operating conditions of the display panel 100A based on the input image data and may provide the generated image data to the data driver 300.

Therefore, because the pixel PX located in the (K)th pixel row receives the reference voltage and the initialization voltage in response to the (K−1)th and (K−2)th scan signals, the organic light emitting display device 1000A can reduce the number of signal lines in the display panel 100A and increase the opening ratio of the display panel 100A. For example, in the UHD (Ultra High Definition) display device, the opening ratio of the display panel 100A can increase about 5% by removing one type of signal lines.

Figure 2:
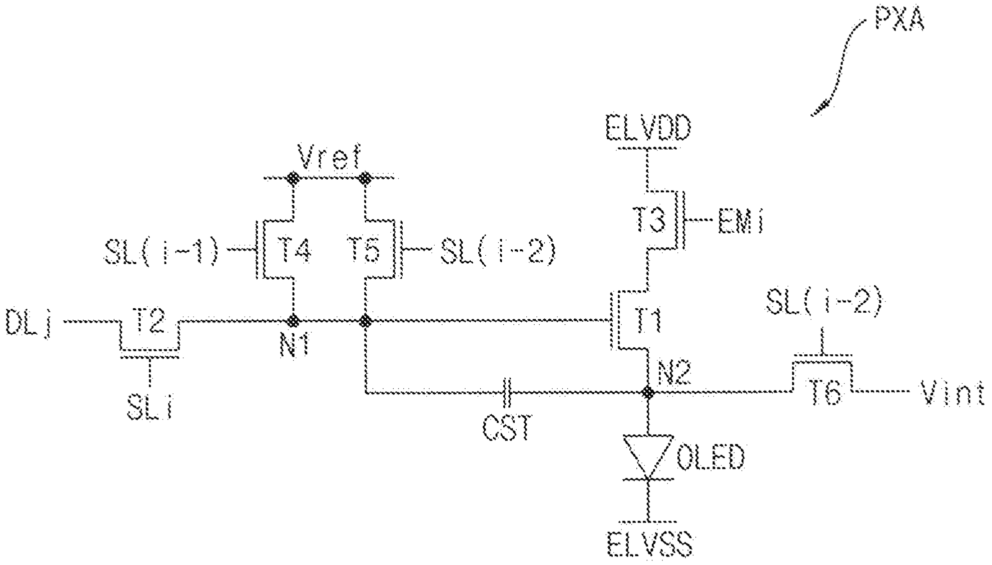
FIG. 2 is a circuit diagram illustrating one example of a pixel included in the organic light emitting display device of FIG. 1.
Figure 3:
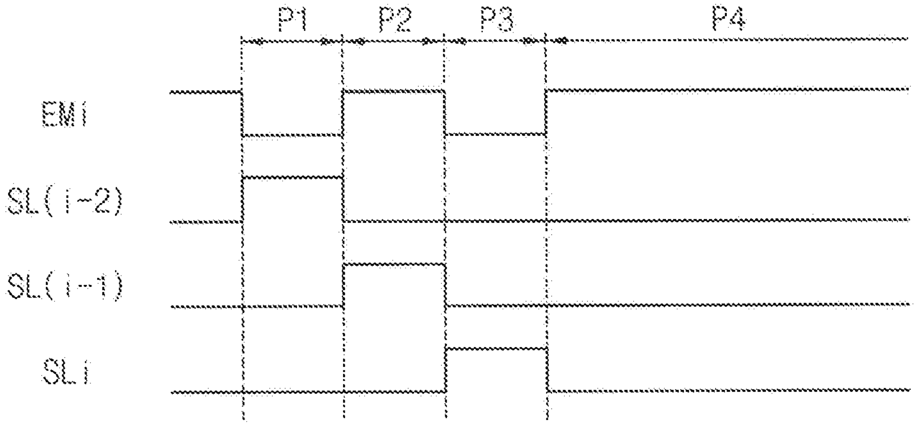
FIG. 3 is a timing diagram illustrating an example of input signals provided to the pixel of FIG. 2.

FIG. 2 is a circuit diagram illustrating one example of a pixel included in an organic light emitting display device of FIG. 1. FIG. 3 is a timing diagram illustrating an example of input signals provided to a pixel of FIG. 2.

Referring to FIGS. 2 and 3, the pixel PXA may be located at row i and column j, where i is an integer greater than 2 and j is an integer greater than 0. The pixel PXA may receive the (i)th scan signal from the (i)th scan line SLi. The pixel PXA may receive the (i−1)th scan signal as the (i)th voltage control signal from the (i−1)th scan line SL(i−1). The pixel PXA may receive the (i−2)th scan signal as the (i)th initialization control signal from the (i−2)th scan line SL(i−2). Therefore, the pixel PXA compensates the threshold voltage using the (i)th scan signal, the (i−1)th scan signal, the (i−2)th scan signal, and the (i)th emission control signal, thereby reducing the number of signal lines and increasing the opening ratio of the display panel.

As shown in FIG. 2, the pixel PXA may include first through sixth transistors T1 through T6, a capacitor CST, and an organic light emitting diode OLED.

The first transistor T1 may be the driving transistor. The first transistor T1 may include a gate electrode connected to a first node N1, a first electrode connected to a second electrode of the third transistor T3, and a second electrode connected to a second node N2. In one example embodiment, the first electrode of the first transistor T1 may be drain electrode, and the second electrode of the first transistor T1 may be source electrode.

The second transistor T2 may include a gate electrode receiving a scan signal from the (i)th scan line SLi, a first electrode receiving a data signal from the (j)th data line DLj, and a second electrode connected to the first node N1.

The third transistor T3 may include a gate electrode receiving an emission control signal from the (i)th emission control line EMi, a first electrode connected to a first power voltage ELVDD, and a second electrode connected to the first electrode of the first transistor T1.

The capacitor CST may include a first electrode connected to the first node N1 and a second electrode connected to the second node N2.

The fourth transistor T4 may include a gate electrode receiving the (i−1)th scan signal (i.e., the (i)th voltage control signal) from the (i−1)th scan line SL(i−1), a first electrode connected to a reference voltage Vref, and a second electrode connected to the first node N1.

The fifth transistor T5 may include a gate electrode receiving the (i−2)th scan signal (i.e., the (i)th initialization control signal) from the (i−2)th scan line SL(i−2), a first electrode connected to the reference voltage Vref, and a second electrode connected to the first node N1.

The sixth transistor T6 may include a gate electrode receiving the (i−2) scan signal (i.e., the (i)th initialization control signal) from the (i−2)th scan line SL(i−2), a first electrode connected to an initialization voltage Vint, and a second electrode connected to the second node N2.

The organic light emitting diode OLED may include a first electrode connected to the second node N2 and a second electrode connected to a second power voltage ELVSS.

As shown in FIG. 3, during the initialization period P1, the (i−2)th scan signal (i.e., the (i)th initialization control signal) may have the on-level, and the (i)th emission control signal may have off-level. In addition, during the initialization period P1, the (i−1)th scan signal (i.e., the (i)th voltage control signal) and the (i)th scan signal may have off-level. Accordingly, the fifth transistor T5 and the sixth transistor T6 may be turned on. The reference voltage Vref may be applied to the first node N1 connected to the gate electrode of the first transistor T1, and the initialization voltage Vint may be applied to the second node N2 connected to the second electrode of the first transistor T1. Therefore, the first node N1 and the second node N2 may be initialized, and the voltage difference (Vgs) between the gate electrode and the second electrode of the first transistor T1 may be set to a difference value between the reference voltage Vref and the initialization voltage Vint (i.e., Vgs=Vref−Vint).

During the compensation period P2, the (i−1) scan signal and the (i)th emission control signal may have on-level. Also, during the compensation period P2, the (i−2)th scan signal and the (i)th scan signal may have off-level. Accordingly, the third transistor T3 and the fourth transistor T4 may be turned on. The reference voltage Vref may be applied to the first node N1 connected to the gate electrode of the first transistor T1. At this time, a voltage of the second node N2 may increase to a voltage level by subtracting the threshold voltage (Vth) of the first transistor T1 from the gate electrode of the first transistor T1 (i.e., the reference voltage Vref). Therefore, the threshold voltage Vth of the first transistor T1 can be measured because the voltage difference (Vgs) between the gate electrode and the second electrode of the first transistor T1 is set to the threshold voltage Vth of the first transistor T1.

During the data writing period P3, the (i)th scan signal may have on-level, and the (i)th emission control signal may have off-level. Also, during the data writing period P3, the (i−2)th scan signal and the (i−1)th scan signal may have off-level. Accordingly, the second transistor T2 may be turned on. The data signal may be applied to the first node N1, and the voltage of the second electrode of the first transistor T1 (i.e., the voltage of the second node N2) may be added a voltage proportional to a difference between the data signal and the reference voltage Vref. For example, the voltage of the second node N2 may be calculated according to [Equation 1].

$$VN2 = Vref - Vth + (Vdata - Vref)\frac{Cst}{(Cst + Coled)}, \quad \text{[Equation 1]}$$

wherein, VN2 is the voltage of the second node, Vref is the reference voltage, Vth is the threshold voltage of the first transistor, Vdata is the data signal, Cst is the capacitance of the capacitor CST, and Coled is the capacitance of the organic light emitting diode OLED.

In addition, the voltage difference (Vgs) between the gate electrode and the second electrode of the first transistor T1 may be calculated according to [Equation 2].

$$Vgs = Vdata - Vref + Vth - (Vdata - Vref)\frac{Cst}{(Cst + Coled)}, \quad \text{[Equation 2]}$$

During the data writing period P4, the (i)th emission control signal may have on-level, and the (i−2) scan signal, the (i−1) scan signal, and the (i)th scan signal may have off-level. Accordingly, the third transistor T3 may be turned on. The first power voltage ELVDD may be applied to the first electrode of the first transistor T1 via the third transistor T3. The driving current may be generated by the first transistor T1 and may be provided to the organic light emitting diode OLED. Here, a magnitude of the driving current may be calculated according to [Equation 3].

$$ID = \frac{k}{2}\left(Vdata - Vref - (Vdata - Vref)\frac{Cst}{(Cst + Coled)}\right)^2, \quad \text{[Equation 3]}$$

wherein, ID is the magnitude of the driving current, and k is constant value determined according to characteristics of the driving transistor (i.e., the first transistor T1) such as electron mobility, parasitic capacitance, channel capacitance, etc.

At this time, the magnitude of the driving current may be determined regardless of the threshold voltage of the first transistor T1 because the threshold voltage of the first transistor T1 is compensated.

Figure 4:
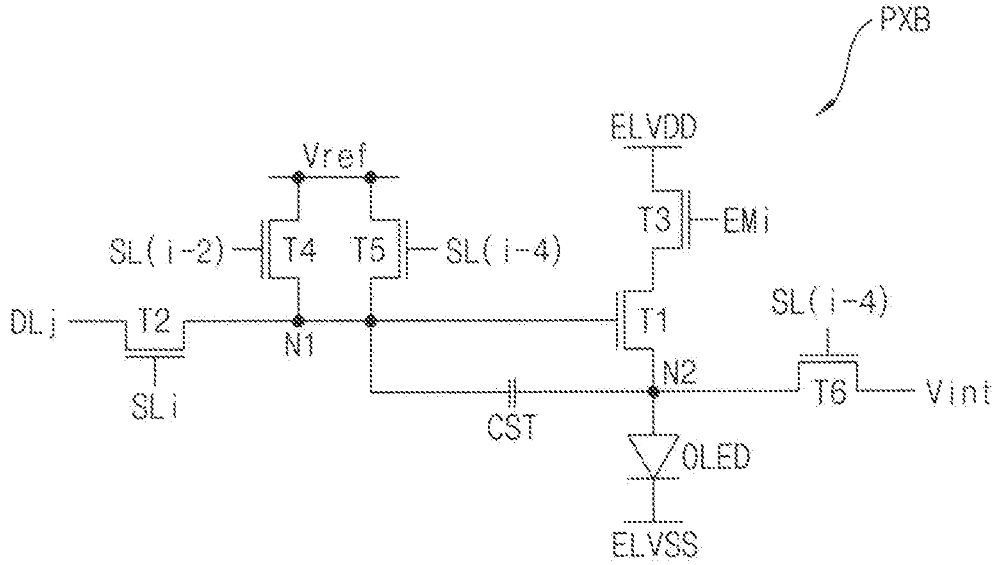
FIG. 4 is a circuit diagram illustrating another example of a pixel included in the organic light emitting display device of FIG. 1.

FIG. 4 is a circuit diagram illustrating another example of a pixel included in an organic light emitting display device of FIG. 1.

Referring to FIG. 4, the pixel PXB may include first through sixth transistors T1 through T6, a capacitor CST, and an organic light emitting diode OLED. The pixel PXB according to the present exemplary embodiment is substantially the same as the pixel of the exemplary embodiment described in FIG. 2, except that the (i)th voltage control signal is received from the (i−2)th scan line SL(i−2) and the (i)th initialization control signal is received from the (i−4)th scan line SL(i−4). Therefore, the same reference numerals will be used to refer to the same or like parts as those described in the previous exemplary embodiment of FIG. 2, and any repetitive explanation concerning the above elements will be omitted.

The pixel PXB may be located at row i and column j, where i is an integer greater than 4 and j is an integer greater than 0. The pixel PXB may receive the (i)th scan signal from the (i)th scan line SLi. The pixel PXB may receive the (i−2)th scan signal as the (i)th voltage control signal from the (i−2)th scan line SL(i−2). The pixel PXB may receive the (i−4)th scan signal as the (i)th initialization control signal from the (i−4)th scan line SL(i−4). For example, when a second half of on-period of the (i−1)th scan signal overlaps a first half of on-period of the (i)th scan signal, the reference voltage Vref is applied to the first node N1 in response to the (i−2) scan signal and the (i−4)th scan signal to perform the initialization operation and the threshold voltage compensation operation of the pixel PXB.

Figure 5:
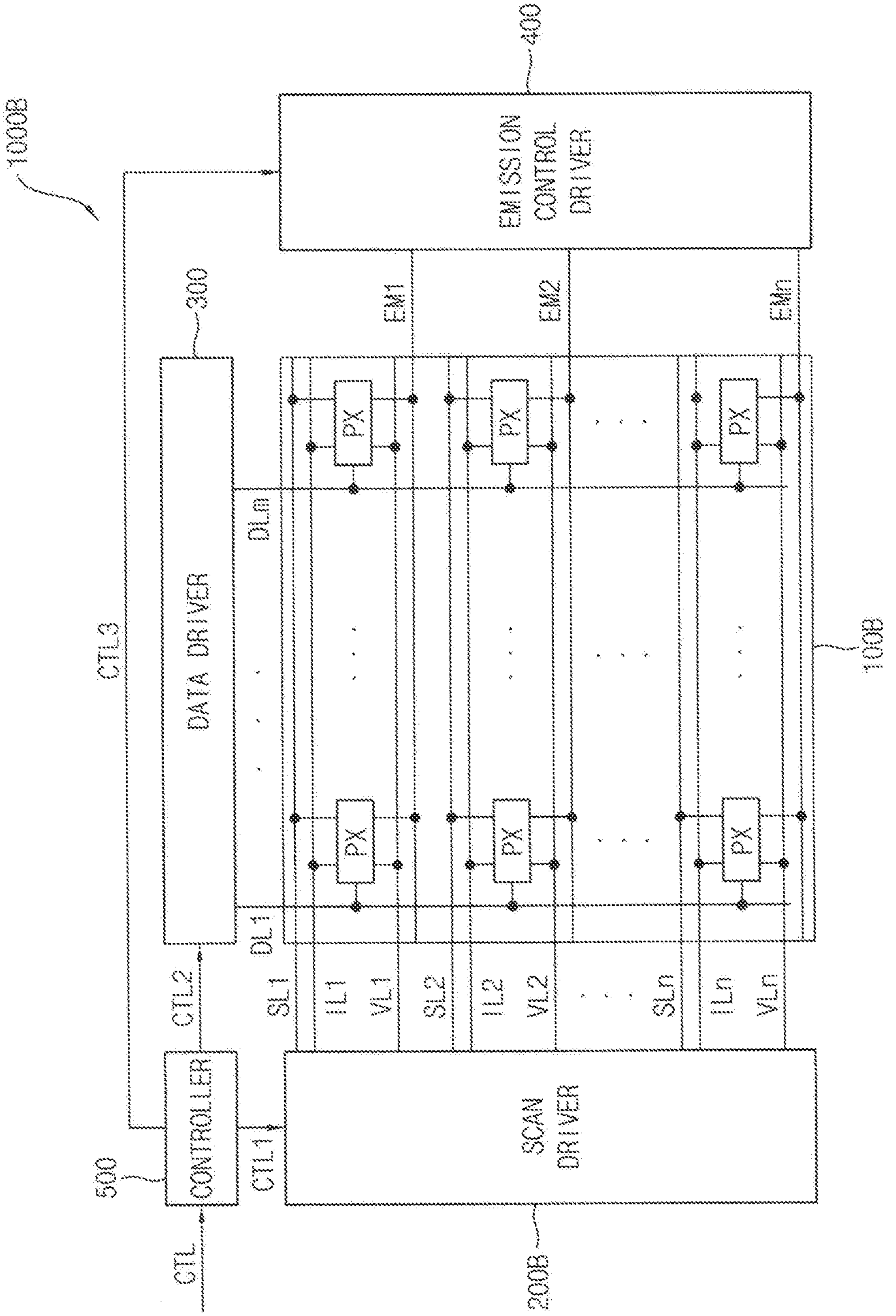
FIG. 5 is a block diagram illustrating an organic light emitting display device according to another example embodiment.

FIG. 5 is a block diagram illustrating an organic light emitting display device according to another example embodiment.

Referring to FIG. 5, the organic light emitting display device 1000B may include a display panel 100B, a scan driver 200B, a data driver 300, an emission control driver 400, and a controller 500. The organic light emitting display device 1000B according to the present exemplary embodiment is substantially the same as the organic light emitting display device of the exemplary embodiment described in FIG. 1, except that the voltage control signal is provided to the pixels via voltage control line and the initialization control signal is provided to the pixels via initialization control line. Therefore, the same reference numerals will be used to refer to the same or like parts as those described in the previous exemplary embodiment of FIG. 1, and any repetitive explanation concerning the above elements will be omitted.

The display panel 100B may include a plurality of pixels PX to display an image. Each pixel PX may receive a scan signal, a voltage control signal, an initialization control signal, an emission control signal, and a data signal and may emit the light based on the data signal. For example, the pixels PX located in the (K)th pixel row may receive the scan signal from the (K)th scan line, may receive the voltage control signal from the (K)th voltage control line, and may receive the initialization control signal from the (K)th initialization control line, where K is an integer.

The pixel PX may receive an initialization voltage in response to the initialization control signal and may receive a reference voltage in response to the voltage control signal in an initialization period. Accordingly, voltages of a gate electrode and a second electrode of the driving transistor of the pixel PX may be initialized. The pixel PX may receive the reference voltage in response to the voltage control signal in the compensation period in order to compensate the threshold voltage of the driving transistor. The pixel PX may receive the data signal in a data writing period, and then may emit the light corresponding to the data signal in the emission period. In one example embodiment, the pixel PX may include five transistors, a capacitor, and an organic light emitting diode OLED. Hereinafter, a structure of the pixel PX will be described in more detail with reference to the FIG. 6.

The scan driver 200B may provide a scan signal, a voltage control signal, and an initialization control signal to the pixels PX based on a first control signal CTL1. In one example embodiment, the scan driver 200B may a plurality of stages outputting first through (N)th scan signals, first through (N)th voltage control signals, and first through (N)th initialization control signals, respectively, where N is an integer greater than 1.

In one example embodiment, the scan driver 200B may generate a (K)th voltage control signal by performing a logical OR operation with a (K−1)th scan signal and a (K−2) scan signal, and wherein K is an integer greater than 2. The scan driver 200B may output the (K−2)th scan signal as the (K)th initialization control signal. Accordingly, the scan driver 200B may provide the initialization control signal and the voltage control signal having on-level to the pixel PX in the initialization period. The scan driver 200B may provide the voltage control signal having on-level to the pixel PX in the compensation period. The scan driver 200B may provide the scan signal having on-level to the pixel PX in the data writing period. Hereinafter, a structure of the scan driver 200B will be described in more detail with reference to the FIGS. 8 and 9.

The data driver 300 may convert image data into the analog type data signal and may provide the data signal to the pixels PX via the data lines DL1 through DLm based on a second control signal CTL2.

The emission control driver 400 may provide the emission control signal to the pixels PX via the emission control lines EM1 through EMn based on a third control signal CTL3. In one example embodiment, the emission control driver 400 may provide the emission control signal having off-level to the pixels PX in the initialization period. The emission control driver 400 may provide the emission control signal having on-level to the pixels PX in the compensation period. The emission control driver 400 may provide the emission control signal having off-level to the pixels PX in the data writing period.

The controller 500 may control the scan driver 200A, the data driver 300, and the emission driver 400.

Therefore, the display device does not need additional driving circuit for compensating the threshold voltage because the scan driver 200B generates the voltage control signal and the initialization control signal as well as the scan signal using previous scan signals. Accordingly, the organic light emitting display device 1000B can reduce a size of embedded display panel driver, decrease a size of non-display region, and reduce the power consumption.

Figure 6:
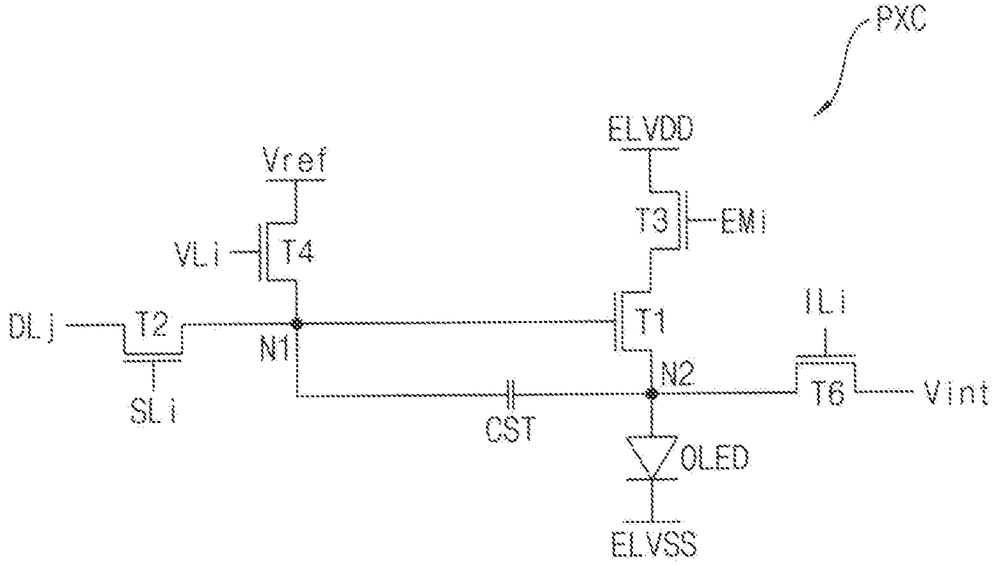
FIG. 6 is a circuit diagram illustrating an example of a pixel included in the organic light emitting display device of FIG. 5.
Figure 7:
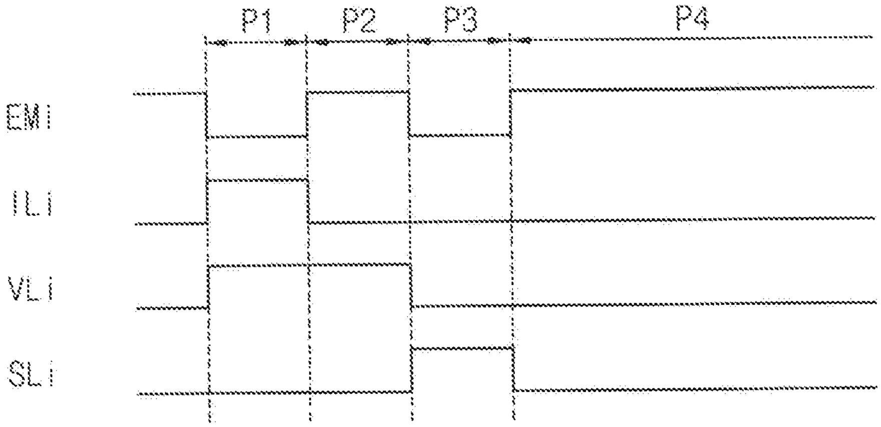
FIG. 7 is a timing diagram illustrating an example of input signals provided to the pixel of FIG. 6.

FIG. 6 is a circuit diagram illustrating an example of a pixel PXC included in an organic light emitting display device of FIG. 5. FIG. 7 is a timing diagram illustrating an example of input signals provided to the pixel PXC of FIG. 6.

Referring to FIGS. 6 and 7, the pixel PXC may be located at row i and column j, where i and j are an integer greater than 0. The pixel PXC may receive the (i)th scan signal from the (i)th scan line SLi. The pixel PXC may receive the (i)th voltage control signal from the (i)th voltage control line VLi. The pixel PXC may receive the (i)th initialization control signal from the (i)th initialization control line ILi.

As shown in FIG. 6, the pixel PXC may include the first, second, third, fourth, and sixth transistors T1, T2, T3, T4, and T6, a capacitor CST, and an organic light emitting diode OLED.

The first transistor T1 may be the driving transistor. The first transistor T1 may include a gate electrode connected to a first node N1, a first electrode connected to a second electrode of the third transistor T3, and a second electrode connected to a second node N2.

The second transistor T2 may include a gate electrode receiving a scan signal from the (i)th scan line SLi, a first electrode receiving a data signal from the (j)th data line DLj, and a second electrode connected to the first node N1.

The third transistor T3 may include a gate electrode receiving an emission control signal EMi from the (i)th emission control line EMi, a first electrode connected to a first power voltage ELVDD, and a second electrode connected to the first electrode of the first transistor T1.

The capacitor CST may include a first electrode connected to the first node N1 and a second electrode connected to the second node N2.

The fourth transistor T4 may include a gate electrode receiving the (i)th voltage control signal from the (i)th voltage control line VLi, a first electrode connected to a reference voltage Vref, and a second electrode connected to the first node N1.

The sixth transistor T6 may include a gate electrode receiving the (i)th initialization control signal from the (i)th initialization control line ILi, a first electrode connected to an initialization voltage Vint, and a second electrode connected to the second node N2.

The organic light emitting diode OLED may include a first electrode connected to the second node N2 and a second electrode connected to a second power voltage ELVSS.

As shown in FIG. 7, during the initialization period P1, the (i)th initialization control signal and the (i)th voltage control signal may have the on-level, and the (i)th emission control signal and the (i)th scan signal may have off-level. During the compensation period P2, the (i)th emission control signal and the (i)th voltage control signal may have on-level, and the (i)th initialization control signal and the (i)th scan signal may have off-level. During the data writing period P3, the (i)th scan signal may have on-level, and the (i)th emission control signal, the (i)th initialization control signal, and the (i)th voltage control signal may have off-level. During the emission period P4, the (i)th emission control signal may have on-level, and the (i)th initialization control signal, the (i)th voltage control signal, and the (i)th scan signal may have off-level. Since operations of the pixel during the initialization period P1, the compensation period P2, the data writing period P3, and the emission period P4, are described above, duplicated descriptions will be omitted.

Figure 8:
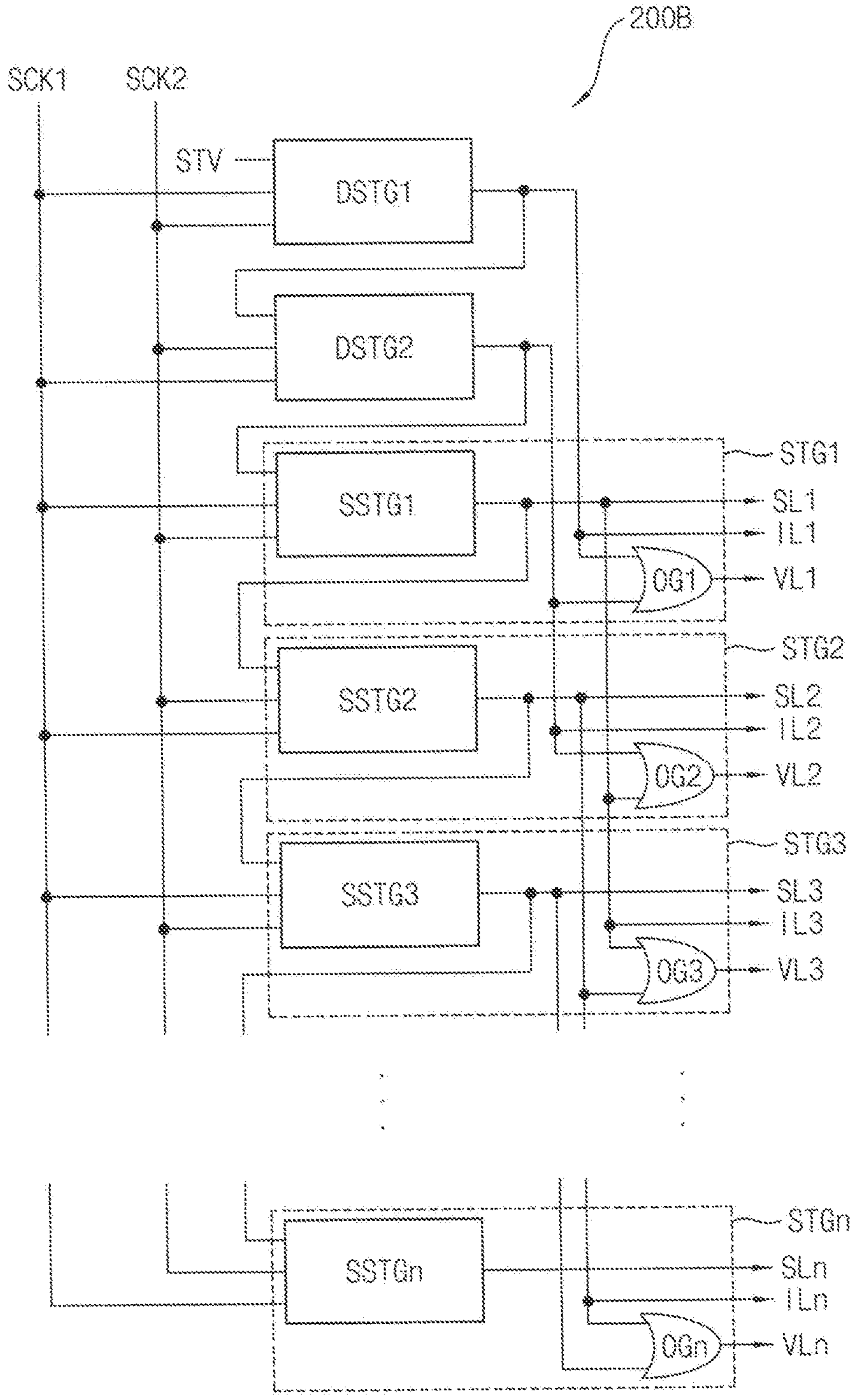
FIG. 8 is a block diagram illustrating an example of a scan driver included in the organic light emitting display device of FIG. 5.
Figure 9:
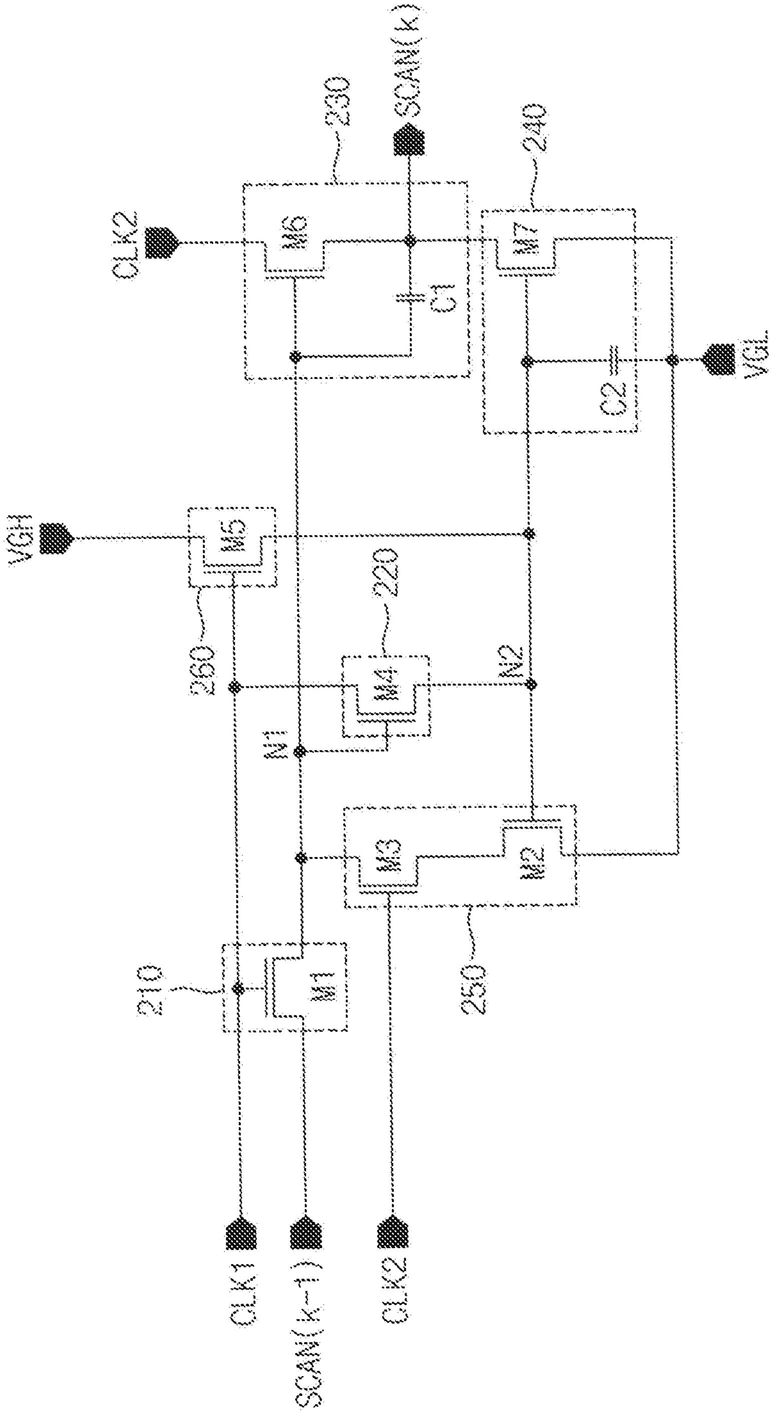
FIG. 9 is a circuit diagram illustrating an example of a sub-stage included in the scan driver of FIG. 8.

FIG. 8 is a block diagram illustrating an example of a scan driver included in an organic light emitting display device of FIG. 5. FIG. 9 is a circuit diagram illustrating an example of a sub-stage included in a scan driver of FIG. 8.

Referring to FIGS. 8 and 9, the scan driver 200B may include the first and second dummy stages DSTG1, DSTG2 and the first through (N)th stages STG1 through STGn, where N is integer greater than 2.

The first dummy stage DSTG1 may receive a scan start signal STV as an input signal. The first dummy stage DSTG1 may receive a first scan clock signal SCK1 as a first clock signal and may receive a second scan clock signal SCK2 as a second clock signal.

The second dummy stage DSTG2 may receive an output signal of the first dummy stage DSTG1 as the input signal. The second dummy stage DSTG2 may receive the second scan clock signal SCK2 as the first clock signal and may receive the first scan clock signal SCK1 as the second clock signal.

Each of the first through (N)th stages STG1 through STGn may output the scan signal, the voltage control signal, and the initialization control signal. In one example embodiment, each stage may include a sub-stage and a logical OR gate.

For example, the first stage STG1 may include a first sub-stage SSTG1 and a first logical OR gate OG1. The first sub-stage SSTG1 may receive the output signal of the second dummy stage DSTG2 as the input signal. The first sub-stage SSTG1 may receive the first scan clock signal SCK1 as the first clock signal and may receive the second scan clock signal SCK2 as the second clock signal. The first stage STG1 may output the output signal of the first sub-stage SSTG1 as the first scan signal to the first scan line SL1. The first stage STG1 may output the output signal of the first dummy stage DSTG1 as the first initialization control signal to the first initialization control line IL1. The first logical OR gate OG1 may generate the first voltage control signal by performing the logical OR operation with the output signal of the first dummy stage DSTG1 and the output signal of the second dummy stage DSTG2. The first stage STG1 may output the first voltage control signal to the first voltage control line VL1.

The second stage STG2 may include a second sub-stage SSTG2 and a second logical OR gate OG2. The second sub-stage SSTG2 may receive the output signal of the first sub-stage SSTG1 as the input signal. The second sub-stage SSTG2 may receive the second scan clock signal SCK2 as the first clock signal and may receive the first scan clock signal SCK1 as the second clock signal. The second stage STG2 may output the output signal of the second sub-stage SSTG2 as the second scan signal to the second scan line SL2. The second stage STG2 may output the output signal of the second dummy stage DSTG2 as the second initialization control signal to the second initialization control line IL2. The second logical OR gate OG2 may generate the second voltage control signal by performing the logical OR operation with the output signal of the second dummy stage DSTG2 and the output signal of the first sub-stage SSTG1. The second stage STG2 may output the second voltage control signal to the second voltage control line VL2.

Also, the (K)th stage may include the (K)th sub-stage and the (K)th logical OR gate, where K is an integer between 3 and N. The (K)th sub-stage may receive the output signal of the (K−1)th sub-stage as the input signal. The (K)th sub-stage may receive the first scan clock signal SCK1 and the second scan clock signal SCK2. The (K)th stage may output the output signal of the (K)th sub-stage as the (K)th scan signal to the (K)th scan line. The (K)th stage may output the output signal of the (K−2)th sub-stage (i.e., the (K−2) scan signal) as the (K)th initialization control signal to the (K)th initialization control line. The (K)th logical OR gate may generate the (K)th voltage control signal by performing the logical OR operation with the output signal of the (K−1)th sub-stage (i.e., the (K−1)th scan signal) and the output signal of the (K−2)th sub-stage (i.e., the (K−2)th scan signal). The (K)th stage may output the (K)th voltage control signal to the (K)th voltage control line.

In addition, the first and second dummy stages DSTG1, DSTG2 and the first through (N)th sub-stages SSTG1 through SSTGn may receive the first voltage corresponding to the first logical level and the second voltage corresponding to the second logical level as described below.

In one example embodiment, a structure of each dummy stage may be substantially the same as a structure of each sub-stage, except that each dummy receives the scan start signal or the output signal of previous dummy stage as the input signal.

As shown in FIG. 9, the (K)th sub-stage SSTGk may include a first input circuit 210, a second input circuit 220, a first output circuit 230, a second output circuit 240, a stabilizing circuit 250, and a holding circuit 260.

The first input circuit 210 may receive the (K−1)th scan signal SCAN(k−1) as an input signal, and apply the input signal to a first node N1 in response to the first clock signal CLK1. The first input circuit 210 may include a first input transistor M1. The first input transistor M1 may include a gate electrode receiving the first clock signal CLK1, a first electrode receiving the input signal, and a second electrode connected to the first node N1.

The second input circuit 220 may apply the first clock signal CLK1 to a second node N2 in response to a voltage of the first node N1. In one example embodiment, the second input circuit 220 may include a second input transistor M4. The second input transistor M4 may include a gate electrode connected to the first node N1, a first electrode receiving the first clock signal CLK1, and a second electrode connected to the second node N2.

The first output circuit 230 may control the (K)th scan signal SCAN(K) to a first logic level (e.g., high level) in response to the voltage of the first node N1. In one example embodiment, the first output circuit 230 may include a first output transistor M6 and a first capacitor C1. The first output transistor M6 may include a gate electrode connected to the first node N1, a first electrode receiving the second clock signal CLK2, and a second electrode connected to an output terminal to which the (K)th scan signal SCAN(K) is output. The first capacitor C1 may include a first electrode connected to the first node N1 and a second electrode connected to the output terminal.

The second output circuit 240 may control the (K)th scan signal SCAN(K) to a second logic level (e.g., low level) in response to a voltage of the second node N2. In one example embodiment, the second output circuit 240 may include a second output transistor M7 and a second capacitor C2. The second output transistor M7 may include a gate electrode connected to the second node N2, a first electrode connected to a second voltage VGL, and a second electrode connected to the output terminal. The second capacitor C2 may include a first electrode connected to the second node N2 and a second electrode connected to the second voltage VGL.

The stabilizing circuit 250 may stabilize the (K)th scan signal SCAN(K) in response to the voltage of the second node N2 and the second clock signal CLK2. The stabilizing circuit 250 may include a first stabilizing transistor M2 and a second stabilizing transistor M3. The first stabilizing transistor M2 may include a gate electrode connected to the second node N2, a first electrode connected to second power voltage VGL, and a second electrode. The second stabilizing transistor M3 may include a gate electrode receiving the second clock signal CLK2, a first electrode connected to the second electrode of the first stabilizing transistor M2, and a second electrode connected to the first node N1.

The holding circuit 260 may maintain a voltage of the second node N2 as the first logic level in response to the first clock signal CLK1. In one example embodiment, the holding circuit 260 may include a holding transistor M5. The holding transistor M5 may include a gate electrode receiving the first clock signal CLK1, a first electrode connected to the first voltage VGH, and a second electrode connected to the second node N2.

Therefore, the scan driver 200B may generate the voltage control signal and the initialization control signal using previous scan signals Although a pixel and an organic light emitting display device having the pixel according to example embodiments have been described with reference to figures, those skilled in the art will readily appreciate that many modifications are possible in the example embodiments without materially departing from the novel teachings and features of the present inventive concept. For example, although the example embodiments describe that each sub-stage includes the first input circuit, a second input circuit, a first output circuit, a second output circuit, a stabilizing circuit, and a holding circuit, the sub-stage can be implemented in various ways.

The present inventive concept may be applied to an electronic device having the organic light emitting display device. For example, the present inventive concept may be applied to a cellular phone, a smart phone, a smart pad, a personal digital assistant (PDA), etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and features of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A pixel comprising:
a first transistor including:
a gate electrode connected to a first node;
a first electrode; and
a second electrode connected to a second node;
a second transistor including:
a gate electrode configured to receive a scan signal;
a first electrode configured to receive a data signal; and
a second electrode connected to the first node;
a third transistor including:
a gate electrode configured to receive an emission control signal;
a first electrode connected to a first power voltage; and
a second electrode connected to the first electrode of the first transistor;
a capacitor including:
a first electrode connected to the first node; and
a second electrode connected to the second node;
a fourth transistor including:
a gate electrode configured to receive a voltage control signal;
a first electrode directly connected to a reference voltage; and
a second electrode directly connected to the first node;
a fifth transistor including:
a gate electrode configured to receive an initialization control signal;
a first electrode directly connected to the reference voltage; and
a second electrode directly connected to the first node;
a sixth transistor including:
a gate electrode configured to receive the initialization control signal;
a first electrode connected to an initialization voltage; and
a second electrode connected to the second node; and
an organic light emitting diode including:
a first electrode connected to the second node; and
a second electrode connected to a second power voltage.

2. The pixel of claim 1, wherein the second transistor is configured to receive the scan signal from a (K)th scan line, wherein K is an integer greater than 2, and
wherein the fourth transistor is configured to receive the voltage control signal from a (K−1)th scan line.

3. The pixel of claim 2, wherein the fifth and sixth transistors are configured to receive the initialization control signal from a (K−2)th scan line.

4. The pixel of claim 1, wherein the emission control signal corresponds to an off-level when the initialization control signal corresponds to an on-level.

5. The pixel of claim 1, wherein the emission control signal corresponds to an on-level when the voltage control signal corresponds to the on-level.

6. The pixel of claim 1, wherein the emission control signal corresponds to an off-level when the scan signal corresponds to an on-level.

7. The pixel of claim 1, wherein the second transistor is configured to receive the scan signal from a (K)th scan line, wherein K is an integer greater than 4, and
wherein the fourth transistor is configured to receive the voltage control signal from a (K−2)th scan line.

8. The pixel of claim 7, wherein the fifth and sixth transistors are configured to receive the initialization control signal from a (K−4)th scan line.

9. An organic light emitting display device comprising:
a display panel including a plurality of pixels;
a scan driver configured to provide a scan signal, a voltage control signal, and an initialization control signal to the pixels;
an emission control driver configured to provide an emission control signal to the pixels; and
a data driver configured to provide a data signal to the pixels,
wherein each of the pixels includes:
a first transistor including:
a gate electrode connected to a first node;
a first electrode; and
a second electrode connected to a second node;
a second transistor including:
a gate electrode configured to receive the scan signal;
a first electrode configured to receive the data signal; and
a second electrode connected to the first node;
a third transistor including:
a gate electrode configured to receive the emission control signal;
a first electrode connected to a first power voltage; and
a second electrode connected to the first electrode of the first transistor;

a capacitor including:
a first electrode connected to the first node; and
a second electrode connected to the second node;
a fourth transistor including:
a gate electrode configured to receive the voltage control signal;
a first electrode directly connected to a reference voltage; and
a second electrode directly connected to the first node;
a sixth transistor including:
a gate electrode configured to receive the initialization control signal;
a first electrode connected to an initialization voltage; and
a second electrode connected to the second node; and
an organic light emitting diode including:
a first electrode connected to the second node; and
a second electrode connected to a second power voltage.

10. The organic light emitting display device of claim 9, wherein each of the pixels further includes:
a fifth transistor including:
a gate electrode configured to receive the initialization control signal;
a first electrode directly connected to the reference voltage; and
a second electrode directly connected to the first node.

11. The organic light emitting display device of claim 10, wherein each of the pixels is configured to receive the scan signal from a (K)th scan line and receive the voltage control signal from a (K−1)th scan line, and wherein K is an integer greater than 2.

12. The organic light emitting display device of claim 11, wherein each of the pixels is configured to receive the initialization control signal from a (K−2)th scan line.

13. The organic light emitting display device of claim 10, wherein each of the pixels is configured to receive the scan signal from a (K)th scan line and receive the voltage control signal from a (K−2)th scan line, and wherein K is an integer greater than 4.

14. The organic light emitting display device of claim 13, wherein each of the pixels is configured to receive the initialization control signal from a (K−4)th scan line.

15. The organic light emitting display device of claim 9, wherein the scan driver includes first through (N)th stages, and
wherein the first through (N)th stages respectively are configured to output first through (N)th scan signals, first through (N)th voltage control signals, and first through (N)th initialization control signals, and wherein N is an integer greater than 1.

16. The organic light emitting display device of claim 15, wherein a (K)th stage is configured to generate a (K)th voltage control signal by performing a logical OR operation with a (K−1)th scan signal and a (K−2) scan signal, and wherein K is an integer greater than 2.

17. The organic light emitting display device of claim 15, wherein a (K)th stage is configured to output a (K−2) scan signal as a (K)th initialization control signal, and wherein K is an integer greater than 2.

18. The organic light emitting display device of claim 9, wherein the scan driver is configured to provide the initialization control signal having an on-level to the pixels in an initialization period, and
wherein the emission control driver is configured to provide the emission control signal having an off-level to the pixels in the initialization period.

19. The organic light emitting display device of claim 9, wherein the scan driver is configured to provide the voltage control signal having an on-level to the pixels in a compensation period, and
wherein the emission control driver is configured to provides the emission control signal having the on-level to the pixel in the compensation period.

20. The organic light emitting display device of claim 9, wherein the scan driver is configured to provide the scan signal having an on-level to the pixels in a data writing period, and
wherein the emission control driver is configured to provide the emission control signal having an off-level to the pixels in the data writing period.

* * * * *